F. W. DE TRAY.
NUT LOCK.
APPLICATION FILED OCT. 25, 1907.
907,473.
Patented Dec. 22, 1908.
2 SHEETS—SHEET 1.
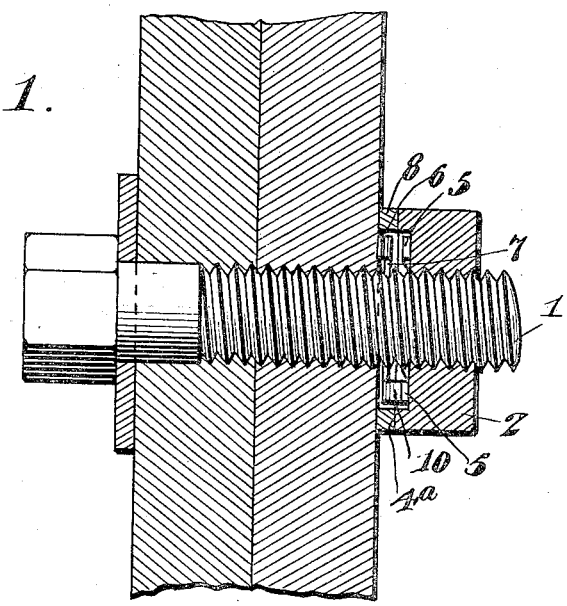
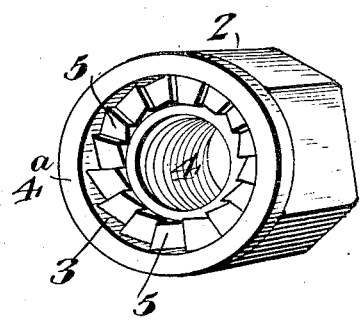
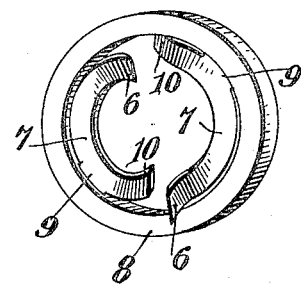
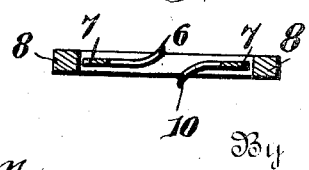
F. W. De Tray, Inventor
Witnesses

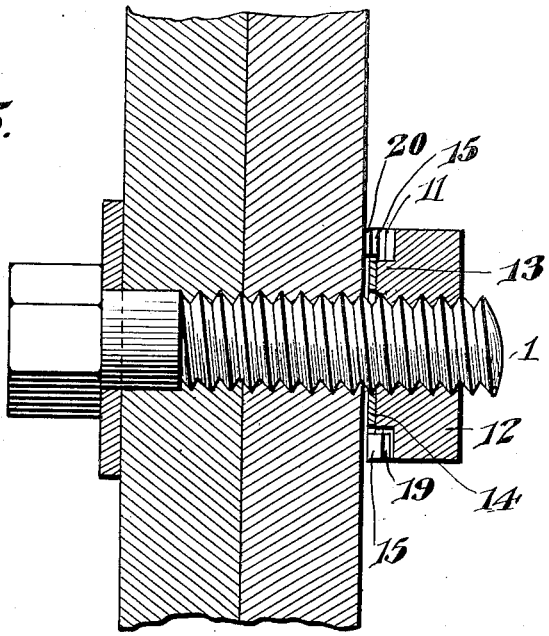
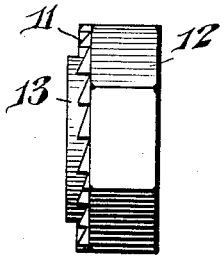
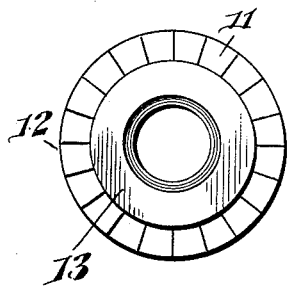
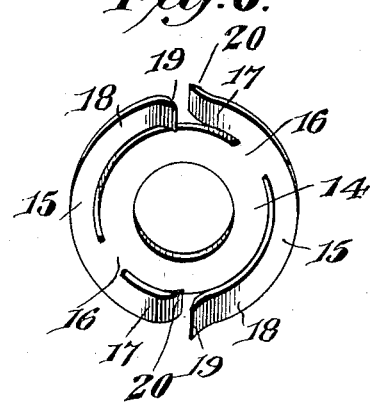

UNITED STATES PATENT OFFICE.

FLOYD WM. DE TRAY, OF AURORA, ILLINOIS, ASSIGNOR OF ONE-FOURTH TO HENRY BATTISFORE, ONE-FOURTH TO HENRY C. OSTERMAN, AND ONE-FOURTH TO FRANK H. DE TRAY, ALL OF CHICAGO, ILLINOIS.

NUT-LOCK.

No. 907,473.  Specification of Letters Patent.  Patented Dec. 22, 1908.

Application filed October 25, 1907. Serial No. 399,142.

*To all whom it may concern:*

Be it known that I, FLOYD WM. DE TRAY, a citizen of the United States, residing at Aurora, in the county of Kane and State of Illinois, have invented a new and useful Nut-Lock, of which the following is a specification.

The invention relates to improvements in nut locks.

The object of the present invention is to improve the construction of nut locks, and to provide a simple, inexpensive and efficient one of great strength and durability, adapted to be readily applied to an ordinary bolt without necessitating any alteration in the construction thereof, and capable of effectually preventing a nut from accidentally unscrewing, when subjected to vibration and rattling incident to its use on rail joints, machinery and the like.

Another object of the invention is to provide a nut lock of this character adapted to permit the nut to be moved when desired without injury either to the nut or the bolt.

With these and other objects in view, the invention consists in the construction and novel combination of parts hereinafter fully described, illustrated in the accompanying drawing, and pointed out in the claims hereto appended; it being understood that various changes in the form, proportion, size and minor details of construction, within the scope of the claims, may be resorted to without departing from the spirit or sacrificing any of the advantages of the invention.

In the drawing:—Figure 1 is a longitudinal sectional view of a nut lock, constructed in accordance with this invention. Fig. 2 is a detail perspective view of the nut. Fig. 3 is a similar view of the locking washer. Fig. 4 is a sectional view of the locking washer, illustrating the arrangement of the springs. Fig. 5 is a longitudinal sectional view of a nut lock, illustrating a modification of the invention. Figs. 6 and 7 are detail views of the nut. Fig. 8 is a detail view of the locking washer.

Like numerals of reference designate corresponding parts in all the figures of the drawings.

The bolt 1, which is of the ordinary construction, is adapted to receive a nut 2 of hexagonal or other form, provided at its inner face with an annular recess 3, surrounding the bolt opening 4, as clearly illustrated in Fig. 2 of the drawings. The nut is provided beyond the annular recess 3 with an engaging face 4$^a$, which may be varied in width to secure the desired strength.

The nut is provided within the annular recess with a ratchet face, consisting of ratchet teeth 5 beveled at one side and shouldered at the opposite side, and adapted to be engaged by the ends 6 of springs 7 of a locking washer 8. The locking washer 8 has a thick heavy outer body portion, which is in the form of a rim or ring to correspond with the engaging end face 4$^a$ of the nut, as clearly illustrated in Fig. 1 of the drawings. The locking washer is provided with a pair of springs 7, curved as shown, and connected at points between their ends with the inner periphery of the locking washer. The connecting portions 9, which are integral with the springs and the rim, are located at points between the center and one end of each spring to form long and short engaging arms. The long resilient arms have their terminals bent outwardly for engaging the teeth of the ratchet face of the nut, and the short stiff arms are bent inwardly, and their terminals 10 engage the surface against which the locking washer is placed. The terminals of the spring are sharpened and when the locking washer is placed against a wooden surface, the short arms of the springs are adapted to embed themselves in such surface to prevent rotary movement of the locking washer. However, when the locking washer is applied to a metallic, or other hard surface, the latter is hacked or roughened by a cold chisel, or other suitable means to enable the spring to engage the said surface without slipping thereon.

The inclined faces of the teeth are arranged to permit the nut to be screwed inwardly on the bolt, and the shoulders are arranged to be engaged by the springs for locking the nut against retrograde rotation. The semi-circular springs and the webs or connecting portions 9 are relatively thin, and the said webs or connecting portions are spaced from the ratchet face of the nut and the surface against which the washer is placed by the relatively thick body portion. The pressure incident to the clamping action of the bolt and the nut is sustained by the rim of the locking washer and the springs are not subjected to the same, so that they are not impaired by the strain or pressure to which the locking washer is subjected. The springs are capable of effectually preventing the nut from accidentally unscrewing when used on rail joints and moving parts of machinery. When it is desired to remove the nut, it may be unscrewed by heavy wrenching, which will bend back the long resilient arms of the springs without injuring either the nut or the bolt.

In Figs. 5 to 8 inclusive of the drawings is illustrated a modification of the invention in which the ratchet teeth 11 of the nut 12 are arranged at the periphery of the nut in a circumferential recess, which forms an inner annular engaging face 13, surrounding the bolt opening. The locking washer consists of an inner rim or body portion 14, and outer curved springs 15, which are formed integral with the inner rim or body portion 14, connecting portions 16 being located at the inner edges of the springs and at points intermediate of the ends thereof to form short stiff arms 17 and long resilient arms 18. The terminals 19 of the long resilient arms are bent outwardly for engaging the teeth of the ratchet face of the nut 12, and the ends 20 of the short arms 17 are bent inwardly for engaging the face against which the body portion or rim of the locking washer is placed. The engaging face 13 of the nut corresponds with the inner rim or body portion 14 of the locking washer, and the operation of the nut lock illustrated in Figs. 5 to 8 inclusive is the same as the form illustrated in Figs. 1 to 4 inclusive.

In each form of the invention the springs completely encircle the bolt, and their terminals engage the ratchet face of the nut and the surface against which the washer is placed at each side of the bolt and at diametrically opposite points.

Having thus fully described my invention, what I claim as new and desire to secure by Letters Patent, is:—

1. In a nut lock, the combination of a nut provided with a ratchet face, and a locking washer composed of a relatively thick body portion and a relatively thin spring connected at an intermediate point of the body portion by a narrow web spaced from the ratchet face of the nut and the surface against which the washer is placed by the relatively thick body portion, said spring consisting of a long resilient arm for engaging the ratchet face of the nut and a short stiff arm for engaging the surface against which the washer is placed.

2. In a nut lock, the combination of a nut provided with a ratchet face, and a locking washer composed of an annular body portion, and a pair of curved springs intermediately connected at the outer side with the inner edge of the body portion at diametrically opposite points by narrow webs, to form long and short arms extending in reverse directions, the body portion surrounding the springs and the long arm of one spring being arranged contiguous to the short arm of the other spring.

3. In a nut lock, the combination with a nut provided with a ratchet face, and a locking washer composed of an annular body portion, and a pair of semi-circular springs arranged concentric with the annular body portion and intermediately connected at one edge only with the same by narrow webs located at diametrically opposite points, said springs being arranged to completely encircle a bolt and having their terminals bent in opposite directions to space them from each other, and engaging both the ratchet face and the surface against which the washer is placed at each side of the bolt and at diametrically opposite points.

4. In a nut lock, the locking washer composed of a relatively thick body portion and relatively thin curved springs each connected near one end to the body portion by a narrow web located at the outer side edge of the spring and spaced from the ratchet face of the nut and from the surface against which the washer is placed by the relatively thick body portion, the inner side edges of the springs being free throughout their entire length, and each spring consisting of a long resilient arm for engaging the ratchet face of the nut and a short stiff arm for engaging the surface against which the washer is placed.

In testimony, that I claim the foregoing as my own, I have hereto affixed my signature in the presence of two witnesses.

FLOYD WM. DE TRAY.

Witnesses:
H. I. STUBBS,
R. C. CAYTON.